Patented Jan. 9, 1951

2,537,706

UNITED STATES PATENT OFFICE 2,537,706

PREPARATION OF POLYVINYL ETHERS

Hyman Rudoff, Springfield, Mass., assignor to Shawinigan Resins Corporation, Springfield, Mass., a corporation of Massachusetts No Drawing. Application August 17, 1948, Serial No. 44,790

9 Claims. (Cl. 260—91.1)

This invention relates to the preparation of polyvinyl ethers.

It is known to prepare polyvinyl ethers by hydrolyzing polyvinyl acetate and then etherifying the resulting hydrolysis product. However, this method is relatively cumbersome and expensive and a simpler method has been desired.

It is an object of this invention to provide a new method for preparing polyvinyl ethers. A particular object of this invention is to provide a one-step method for preparing polyvinyl ethers from polyvinyl esters.

These and other objects are attained according to this invention by reacting a polyvinyl ester with a compound from the group consisting of dimethyl sulfate and diethyl sulfate in the presence of a solvent and an aqueous solution of an alkali metal hydroxide.

The following example is illustrative of the present invention but is not to be construed as limitative thereof. Where parts are mentioned, they are parts by weight.

Example 10 parts of polyvinyl acetate are dissolved in 160 parts of acetone. The resulting solution is heated at a temperature of 55° C. and there are added to the solution with vigorous stirring, 40 parts of dimethyl sulfate and 41 parts of a 30% aqueous sodium hydroxide solution over a period of about 1.8 hours.

After continuing the stirring and heating of the reaction mixture for about 15 minutes more, the resulting polyvinyl ether is purified by precipitation with water and separation of the precipitated polyvinyl ether from the liquid medium. After redissolving the solid product in acetone, reprecipitation with water and separation from the liquid medium the product is dried by heating at 120° C.

The product is found to contain 6% acetate groups calculated as polyvinyl acetate and the balance polyvinyl methyl ether. It is soluble in acetone and alcohol.

From the foregoing example, which is illustrative of the present invention, it can readily be seen that the present invention provides an unexpectedly valuable method for preparing ethers of polyvinyl alcohol. For example, it is to be noted that it is not necessary to hydrolyze the polyvinyl ester in a separate step but by means of the one step of the invention, acetate or other ester groups are directly replaced with ether groups.

Numerous variations may be introduced in the process of the invention as exemplified by the example. Thus, in place of polyvinyl acetate, other polymers of vinyl esters of carboxylic acids may be used, as for example, polyvinyl formate, polyvinyl propionate, polyvinyl butyrate, polyvinyl valerate, polyvinyl hexoate, polyvinyl phthalate, polyvinyl benzoate, etc.

The polyvinyl acetate used in the example is characterized by such a degree of polymerization as to have a viscosity of about 7 centipoises in a 1-molar benzene solution at 20° C. Polyvinyl acetates exhibiting other viscosity characteristics may be used, e. g., viscosities of 5–500 or more centipoises in 1-molar benzene solutions at 20° C. Other polyvinyl esters may have corresponding degrees of polymerization.

In place of dimethyl sulfate, there may be used diethyl sulfate as the etherifying agent.

In place of sodium hydroxide, other alkali metal hydroxides may be used in the process of the invention, as for example, potassium hydroxide, cesium hydroxide and rubidium hydroxide.

In place of acetone, other liquids may be used which are solvents for both the initial polyvinyl ester and the ether product. Examples of other suitable solvents include methyl ethyl ketone and other water-miscible, non-reactive solvents. Ethanol may be used as the solvent when the etherifying agent is diethyl sulfate and methanol when the etherifying agent is dimethyl sulfate.

The temperature at which the reaction is conducted may be substantially varied. However, it is usually preferred that temperatures of not over 60° C. be employed to avoid undesirable side reactions, i. e., temperatures of 30–60° C. are preferred. The duration of the reaction is governed by the nature and proportions of the ingredients, the temperature and the results desired. Under certain circumstances, it may be desirable to continue the reaction until equilibrium is established while in other cases, it may be desirable to employ an excess of the etherifying agent and stop the reaction when the desired degree of etherification has occurred.

The relative proportions of polyvinyl ester, etherifying agent and alkali metal hydroxide may be substantially varied. Usually it is found desirable to employ a substantial excess of etherifying agent in order to promote a rapid reaction. For example, up to a 200–500% excess of the etherifying agent based on the desired degree of etherification may be found to be desirable.

Sufficient alkali metal hydroxide should be used to be at least equivalent to the desired degree of ester replacement (etherification). Larger amounts may be used, for example, up to a 200–500% excess over the equivalent amount.

The concentration of the aqueous solution of the alkali metal hydroxide may be substantially varied. For example, a 20–75% solution may be used. However, the amount of water thereby introduced should not be in excess of an amount which is miscible with the solvent used.

The amount of solvent which is used may also be varied substantially. Preferably, the amount used is sufficient to keep the reactants and the ether product in solution throughout the reaction. An excessive amount is usually avoided for economic reasons.

As indicated above, the extent of the reaction may be substantially varied by variation in the reaction conditions. While replacement of as little as 1% of the acyl groups of the polyvinyl esters by ether groups may be carried out by the process of the invention, usually, it is found that the more valuable products do not contain less than 5% ether groups (based on total acyl groups originally present). If desired, all of the acyl groups may be replaced by ether groups. According to another embodiment of the invention, the reaction conditions are so correlated as to produce a polyvinyl ether in which 25–75% of the acyl group originally present are replaced by ether groups.

It is obvious that many variations may be made in the products and processes of this invention without departing from the spirit and scope thereof as defined in the appended claims.

What is claimed is:

1. A process for preparing polyvinyl ethers which comprises reacting a polymer of a vinyl ester of an organic acid with an etherifying agent from the group consisting of dimethyl sulfate and diethyl sulfate in the presence of an aqueous solution of an alkali metal hydroxide and a water-miscible solvent for both the polyvinyl ester and the polyvinyl ether.

2. A process as defined in claim 1 in which the etherifying agent is dimethyl sulfate.

3. A process as defined in claim 1 in which the etherifying agent is diethyl sulfate.

4. A process as defined in claim 1 in which the polyvinyl ester is polyvinyl acetate.

5. A process as defined in claim 4 in which the etherifying agent is dimethyl sulfate.

6. A process as defined in claim 4 in which the etherifying agent is diethyl sulfate.

7. A process for preparing a polyvinyl ether which comprises reacting polyvinyl acetate, while dissolved in acetone, with an etherifying compound from the group consisting of dimethyl sulfate and diethyl sulfate in the presence of an aqueous solution of sodium hydroxide until at least 1% of the acyl groups are replaced with ether groups.

8. A process as defined in claim 7 in which the reaction is continued until at least 5% of the acyl groups are replaced by ether groups.

9. A process as defined in claim 7 in which the reaction is continued until substantially all of the acyl groups are replaced by ether groups.

HYMAN RUDOFF.

REFERENCES CITED

The following references are of record in the file of this patent:

UNITED STATES PATENTS

| Number | Name | Date |
|---|---|---|
| 2,145,345 | Dreyfus | Jan. 31, 1939 |
| 2,373,782 | Scheiderbauer | Apr. 17, 1945 |
| 2,379,889 | Dorland | July 10, 1945 |

OTHER REFERENCES

Jones British Plastics, vol. 16, pp. 77–83 (Feb. 1944).